United States Patent
Kawamoto

(10) Patent No.: US 8,378,996 B2
(45) Date of Patent: Feb. 19, 2013

(54) TOUCH PANEL DISPLAY APPARATUS AND DETECTION METHOD FOR USE IN THE SAME

(75) Inventor: Tsutomu Kawamoto, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 197 days.

(21) Appl. No.: 13/020,870

(22) Filed: Feb. 4, 2011

(65) Prior Publication Data

US 2011/0205187 A1    Aug. 25, 2011

(30) Foreign Application Priority Data

Feb. 25, 2010    (JP) .................................. 2010-40510

(51) Int. Cl.
*G06F 3/042* (2006.01)
(52) U.S. Cl. ...................... 345/175; 345/173; 178/18.01
(58) Field of Classification Search .......... 345/173–179; 178/18.01–18.04
See application file for complete search history.

(56) References Cited

U.S. PATENT DOCUMENTS

| 2002/0175900 | A1* | 11/2002 | Armstrong | 345/173 |
| 2009/0189878 | A1* | 7/2009 | Goertz et al. | 345/175 |
| 2010/0020040 | A1* | 1/2010 | Han | 345/173 |
| 2010/0026666 | A1* | 2/2010 | Ho | 345/175 |
| 2010/0309146 | A1* | 12/2010 | Lee et al. | 345/173 |
| 2011/0014955 | A1* | 1/2011 | Kim et al. | 455/566 |
| 2011/0089857 | A1* | 4/2011 | Diederiks | 315/291 |
| 2011/0148803 | A1* | 6/2011 | Xu | 345/174 |

FOREIGN PATENT DOCUMENTS

| JP | 03-013372 | 1/1991 |
| JP | 2005-115714 | 4/2005 |
| JP | 2006-011568 | 1/2006 |

* cited by examiner

*Primary Examiner* — Kimnhung Nguyen
(74) *Attorney, Agent, or Firm* — Turocy & Watson, LLP

(57) ABSTRACT

Embodiments described herein are to provide a touch panel display apparatus which includes a horizontal row of light-emitting elements and a horizontal row of light-receiving elements arranged on horizontal sides of a display unit. The touch panel display apparatus further include a vertical row of light-emitting elements and a vertical row of light-receiving elements arranged on vertical sides of the display unit. The touch panel display apparatus further include a control unit which activates a first set of the light-emitting elements and the corresponding light-receiving elements when the touch pattern is disposed between the light-emitting elements and the corresponding light-receiving elements, and inactivate a second set of the light-emitting elements and the corresponding light-receiving elements when the touch pattern is not disposed between the light-emitting elements and the corresponding light-receiving elements.

20 Claims, 8 Drawing Sheets

TOUCH PANEL DISPLAY APPARATUS AND DETECTION METHOD FOR USE IN THE SAME

CROSS-REFERENCE TO RELATED APPLICATIONS

This application is based upon and claims the benefit of priority from Japanese Patent Application No. 2010-040510, filed on Feb. 25, 2010, the entire contents of which are incorporated herein by reference.

FIELD

Embodiments described herein relate generally to a touch panel display apparatus which has a variable scanning range and a detection method for use in the touch panel display apparatus.

BACKGROUND

Recently, as a display with a touch screen used in a POS (point of sales) terminal or the like, a touch panel type display apparatus capable of not only displaying an image but also inputting operation information by directly touching the screen is widely used. In such a touch panel display apparatus, a plurality of light-emitting diodes are arranged in a row on one side of the touch panel display apparatus while the same number of optical sensors as the light-emitting diodes are arranged in a row on the opposite side of the touch panel display apparatus. When an operator touches the screen, such touching operation blocks light beams from some light-emitting diodes from reaching the opposite corresponding optical sensors, by which an operation performed by the operator is detected. However, using such a number of light-emitting diodes and optical sensors may cause an increase in power consumption.

The related art provides an optical touch panel which detects an operator's input operation by using rows of light-transmitting elements and corresponding rows of light-receiving elements, where optical scanning operations (using the rows of light-transmitting elements and the rows of light-receiving elements) can be thinned out by widening a detection pitch based on a predetermined condition, to thereby reduce power consumption.

However, such a configuration does not adequately take into account the actual manner of using a touch panel. In an actual touch panel, touchable patterns touched by an operator may not be uniformly arranged throughout an entire surface of the touch panel. Because touchable patterns are usually displayed on a limited area of the touch panel, the operator only touches the limited area where the touch patterns are displayed. Accordingly, an optical scanning may not be necessarily performed in an area where the touch patterns are not displayed.

DETAILED DESCRIPTION

According to one embodiment, a touch panel display apparatus includes a display unit, a first horizontal row of light-emitting elements arranged on a first horizontal side of the display unit, a second horizontal row of light-receiving elements arranged on a second horizontal side of the display unit, a first vertical row of light-emitting elements arranged on a first vertical side of the display unit, a second vertical row of light-receiving elements arranged on a second vertical side of the display unit, an image generation and a control unit. Each light-receiving element in the second horizontal row is configured to receive light from a corresponding light-emitting element in the first horizontal row, and each light-receiving element in the second vertical row is configured to receive light from a corresponding light-emitting element in the first vertical row. The image generation unit is configured to generate an image signal and provide the image signal to the display unit, which displays a touch pattern for use in a touch operation based on the image signal. The control unit is configured to activate a first set of the light-emitting elements and the corresponding light-receiving elements when the touch pattern is disposed between the light-emitting elements and the corresponding light-receiving elements and inactivate a second set of the light-emitting elements and the corresponding light-receiving elements when the touch pattern is not disposed between the light-emitting elements and the corresponding light-receiving elements.

Embodiments will now be described in detail with reference to the drawings.

Figure 1:
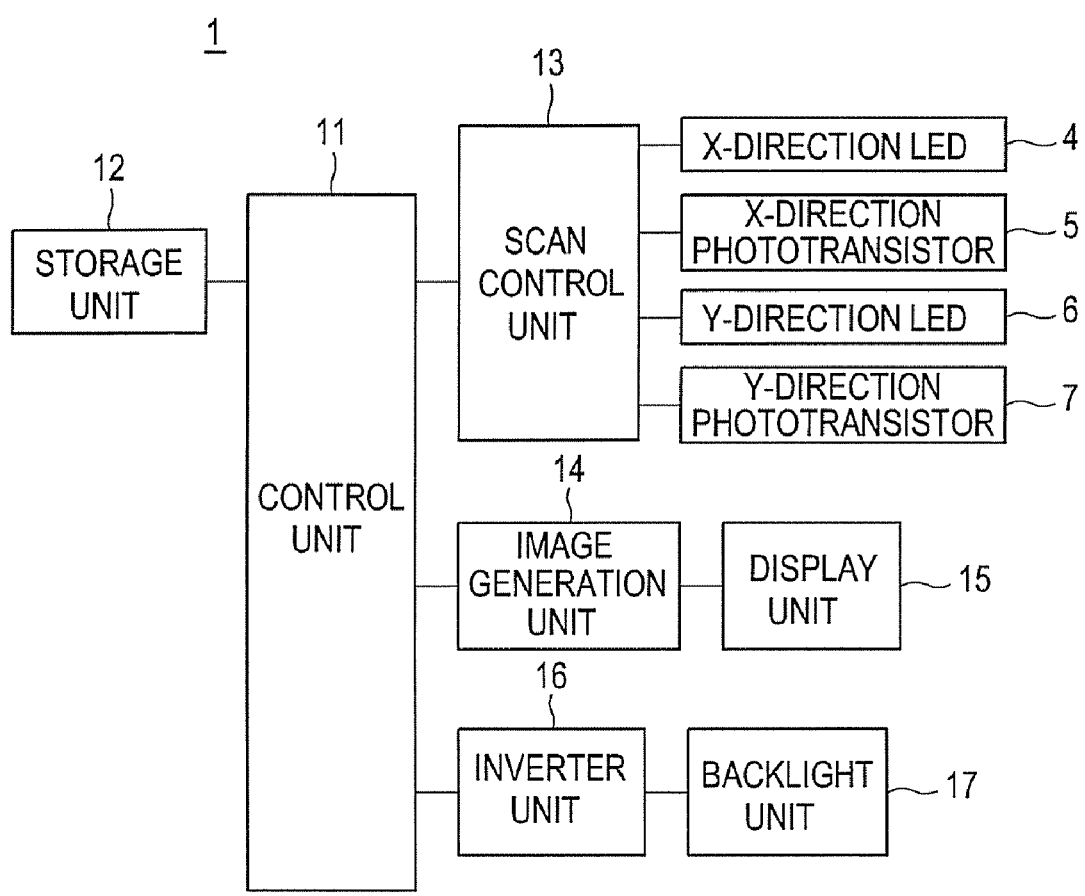
FIG. 1 is a block diagram showing an example of an electrical configuration of a touch panel display apparatus according to an embodiment of the present disclosure.

A touch panel display apparatus 1 according to one embodiment of the present disclosure may be used in a touch POS terminal. As shown in FIG. 1, the touch panel display apparatus 1 includes a control unit 11, a storage unit 12, a scan control unit 13, X-direction LEDs (Light Emitting Diodes) 4, X-direction phototransistors 5, Y-direction LEDs 6, Y-direction phototransistors 7, an image generation unit 14, a display unit 15, a backlight unit 17, and an inverter unit 16. The control unit 11 controls the operations of the touch panel display apparatus 1. The storage unit 12 stores therein various operation programs and operation information. The scan control unit 13 controls the operations of the respective LEDs and phototransistors including the X-direction LEDs 4, the X-direction phototransistors 5, the Y-direction LEDs 6, and the Y-direction phototransistors 7. The image generation unit 14 generates information of an image to be displayed on the display unit 15. The display unit 15 displays the image generated by the image generation unit 14 on a liquid crystal screen or the like. The backlight unit 17 illuminates the liquid crystal screen of the display unit 15 from the back side thereof. The inverter unit 16 supplies a drive current to the backlight unit 17.

Figure 2:
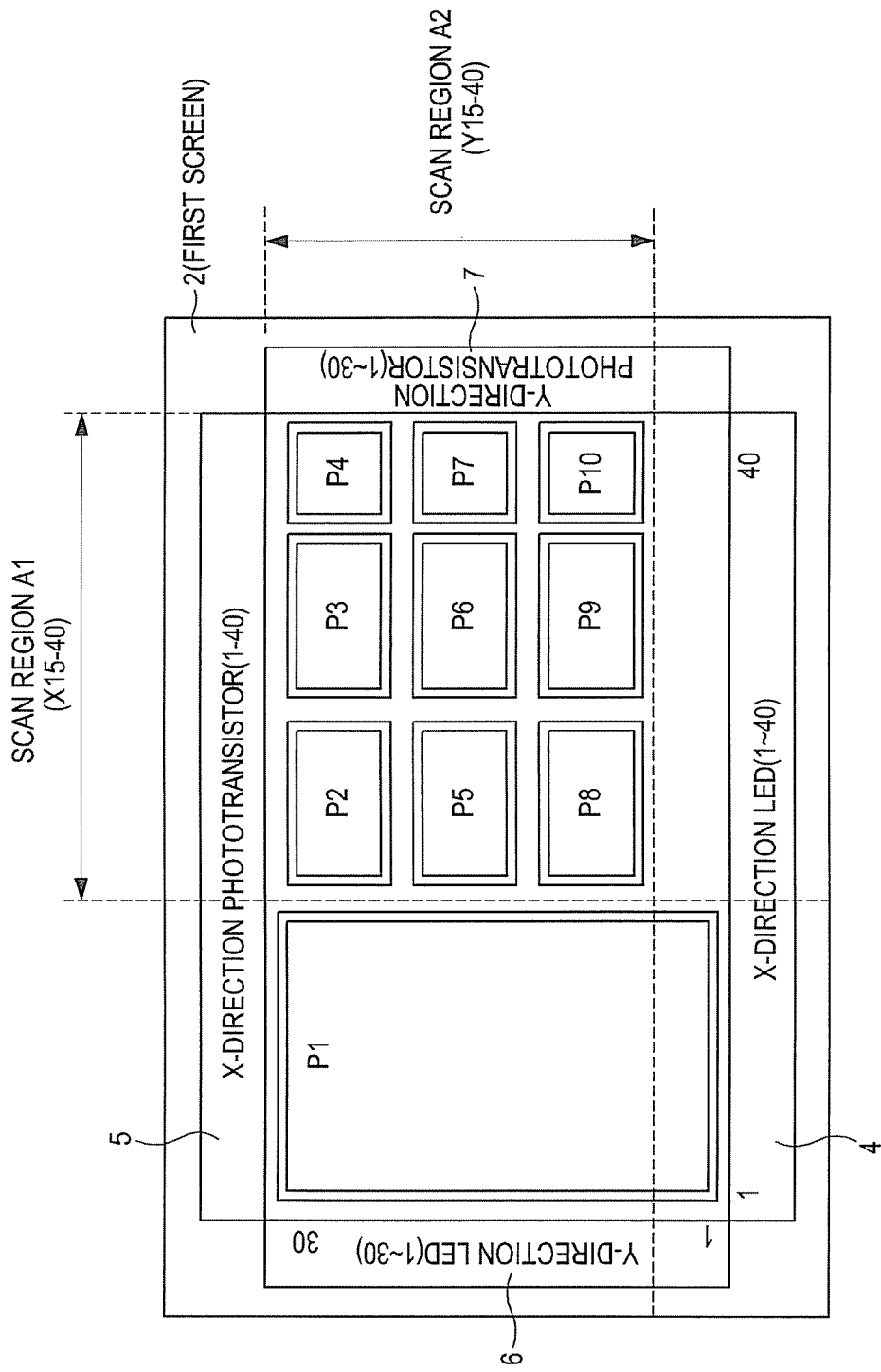
FIG. 2 is an explanatory diagram showing an example of touch patterns displayed on the touch panel display apparatus.

In the touch panel display apparatus 1 with the above-mentioned configuration, a plurality of touch patterns P1 to P10 as shown in FIG. 2 may be displayed on the display unit 15 based on a pattern frame of a first screen 2 which is generated by the image generation unit 14. FIG. 2 is an explanatory diagram showing an example of touch patterns of the touch panel display apparatus 1. In this example, the touch patterns P2 to P10 refer to actual touchable patterns on the first screen 2. The scan control unit 13 performs scanning in a range of an X-direction scan region A1 (X15-40) and a Y-direction scan region A2 (Y5-30).

In case of scanning the entire surface of the first screen 2, the scanning is performed in a region (X1-40, Y1-30). However, a region (X1-15) and a region (Y1-5) do not include any touch patterns that require scanning to be performed by the scan control unit 13. Thus, since the scan control unit 13 does not perform the scanning in a region where a touch operation is not performed by an operator, power consumption can be reduced.

Figure 3:
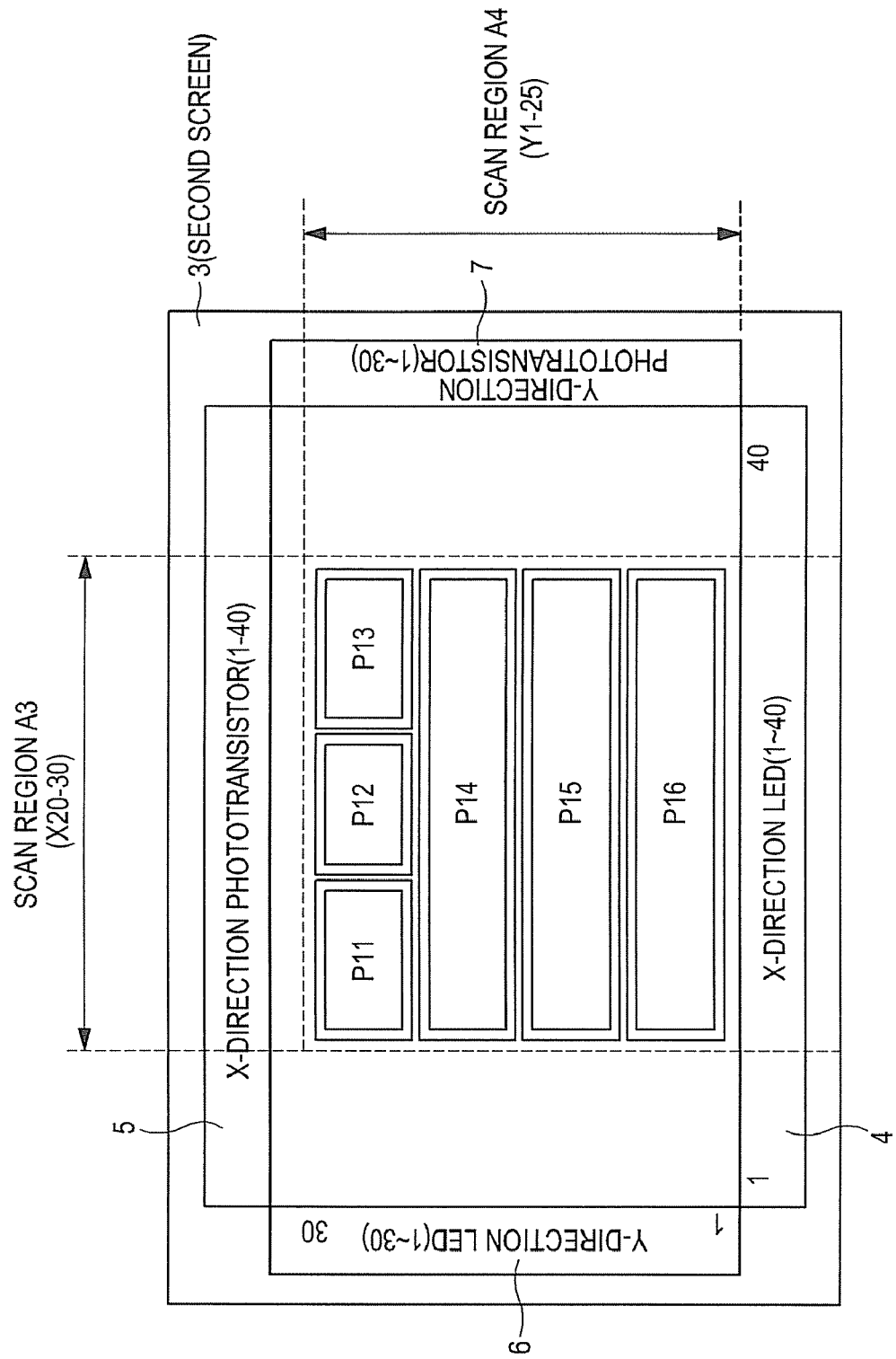
FIG. 3 is an explanatory diagram showing another example of the touch patterns displayed on the touch panel display apparatus.

Further, in the touch panel display apparatus 1, a plurality of touch patterns P11 to P16 as shown in FIG. 3 may be displayed on the display unit 15 based on a pattern frame of a second screen 3 which is generated by the image generation unit 14. FIG. 3 is an explanatory diagram showing another example of the touch patterns of the touch panel display apparatus. In this case, the touch patterns P11 to P16 refer to actual touchable patterns on the second screen 3. The scan control unit 13 performs scanning in a range of an X-direction scan region A3 (X20-30) and a Y-direction scan region A4 (Y1-25).

In case of scanning the entire surface of the second screen 3, the scanning can be performed in the entire region (X1-40, Y1-30). However, a region (X1-20) and a region (Y25-30) do not include any touch patterns that require scanning to be performed by the scan control unit 13. In such a case, similar to the case of the first screen 2, the scan control unit 13 does not perform scanning in those regions where a touch operation is not performed by an operator, and therefore power consumption is reduced.

In this manner, the touch panel display apparatus 1 may display a plurality of different pattern frames generated by the image generation unit 14 based on the information stored in the storage unit 12. Further, the scan control unit 13 may adjust a scan region depending on the different pattern frames.

Figure 4:
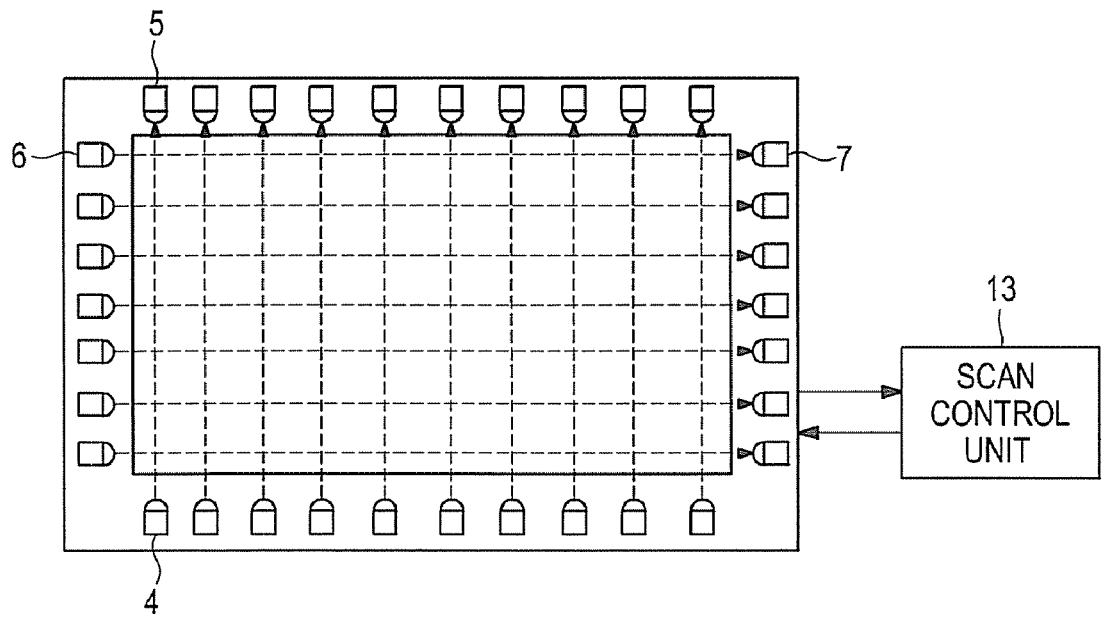
FIG. 4 is an explanatory diagram showing rows of light-emitting elements and rows of light-receiving elements of the touch panel display apparatus.
Figure 5:
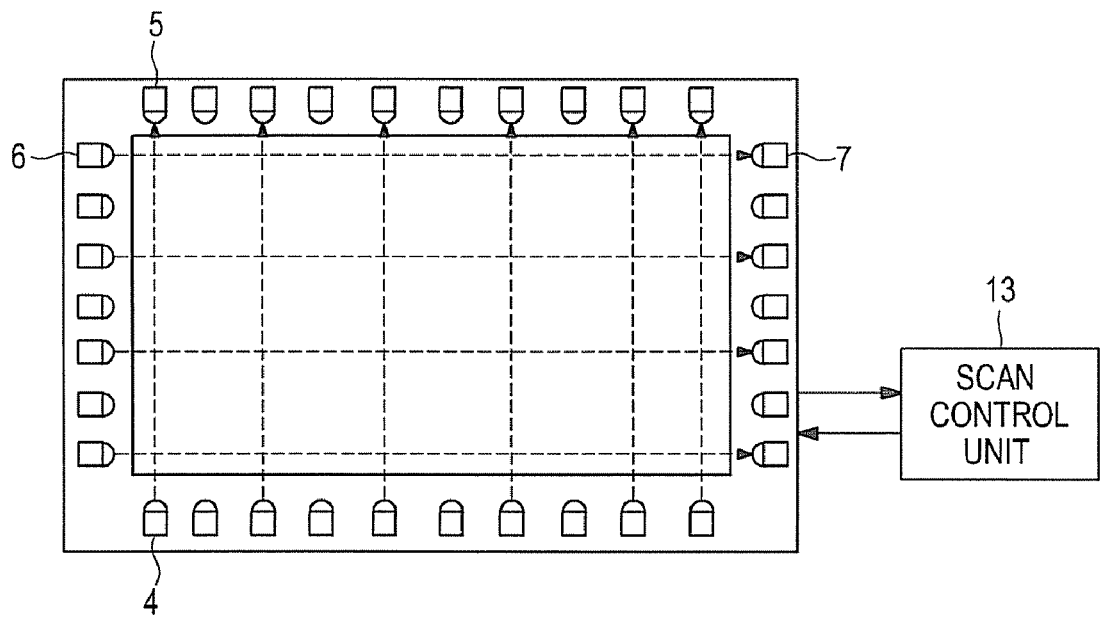
FIG. 5 is an explanatory diagram showing the principle of a thin-out process of the touch panel display apparatus.

With reference to the drawings, a scanning process including a thin-out process of the touch panel display apparatus 1 according to one embodiment will be described as follows. FIG. 4 is an explanatory diagram showing rows of light-emitting elements and rows of light-receiving elements of the touch panel display apparatus 1. FIG. 5 is an explanatory diagram showing the principle of the thin-out process of the touch panel display apparatus 1. As shown in FIG. 4, light is emitted and received in a one-to-one correspondence between a plurality of X-direction LEDs 4 forming a horizontal row of light-emitting elements and a plurality of X-direction phototransistors 5 forming a horizontal row of light-receiving elements. In the same manner, light is emitted and received in a one-to-one correspondence between a plurality of Y-direction LEDs 6 forming a vertical row of light-emitting elements and a plurality of Y-direction phototransistors 7 forming a vertical row of light-receiving elements.

The thin-out process is performed in the manner as shown in FIG. 5. Light is emitted and received in alternate pairs of the plurality of X-direction LEDs 4 forming the horizontal row of light-emitting elements and the plurality of X-direction phototransistors 5 forming the horizontal row of light-receiving elements. In the same manner, light is emitted and received in alternate pairs of the plurality of Y-direction LEDs 6 forming the vertical row of light-emitting elements and the plurality of Y-direction phototransistors 7 forming the vertical row of light-receiving elements. As a result, the accuracy of detecting touch operations in the configuration as shown in FIG. 5 is lowered to about half the level of detection accuracy of the configuration shown in FIG. 4 while power consumption is reduced to about half the power consumption of the configuration shown in FIG. 4. By thinning-out the scanning process using the LEDs and the phototransistors, the detection sensitivity of a touch operation is lowered, but the power consumption is reduced substantially. A thin-out process is not limited to the configuration shown in FIG. 5, but can be performed in various other methods and configurations.

Figure 6:
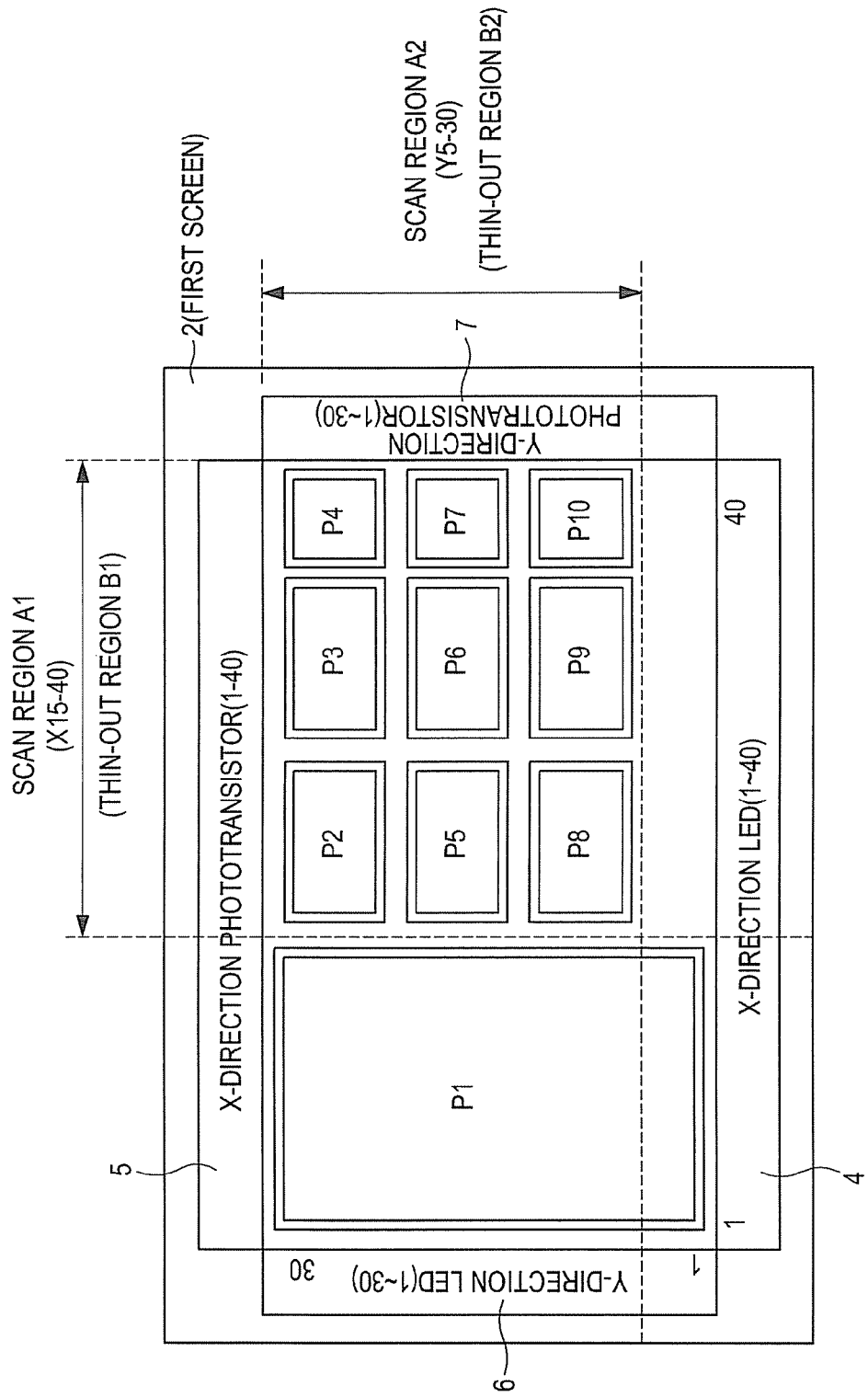
FIG. 6 is an explanatory diagram showing an example of the thin-out process of the touch panel display apparatus.

Referring to FIG. 6, touch patterns of the first screen 2 that are actually used in touch operations are touch patterns P2 to P10. Thus, the scan control unit 13 controls scanning so as to scan the area defined by the X-direction scan region A1 (X15-40) and the Y-direction scan region A2 (Y5-30). In FIG. 6, the scan region A1 (X15-40) is defined as a thin-out region B1 (X15-40) and the scan region A2 (Y5-30) is defined as a thin-out region B2 (Y5-30). In the thin-out region B1 and thin-out region B2, the thin-out process as described above in reference to FIG. 5 may be performed.

As a result, the scan control unit 13 does not perform a scan in a region where a touch operation is not performed, and therefore power consumption can be reduced. Additionally, by performing a thin-out process in a region which includes touch patterns where a touch operation is performed, the power consumption can further be reduced.

Figure 7:
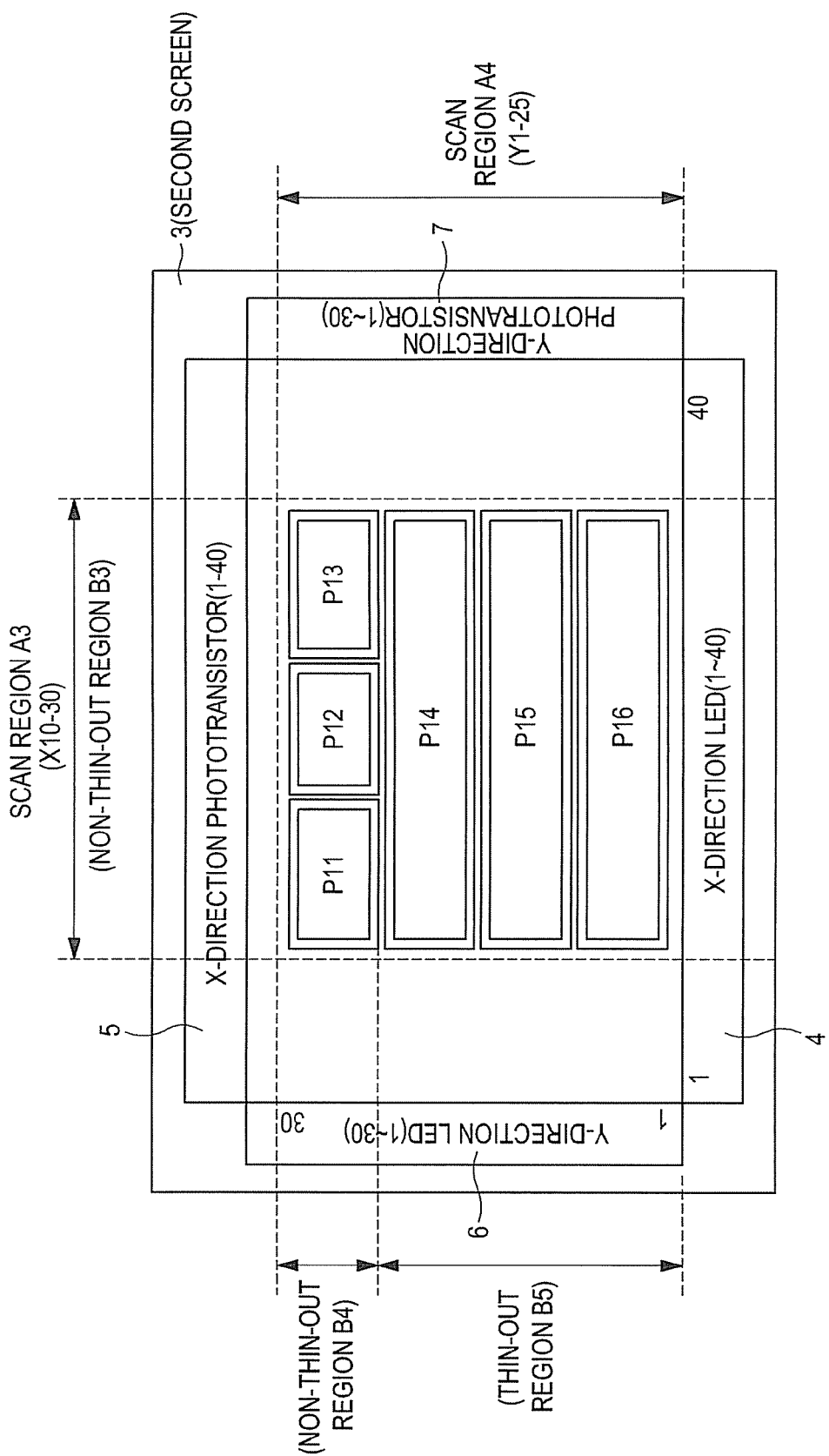
FIG. 7 is an explanatory diagram showing an example of the thin-out process of the touch panel display apparatus.

In the touch panel display apparatus 1, as shown in FIG. 7, a plurality of touch patterns P11 to P16 are displayed on the display unit 15 based on the pattern frame of the second screen 3 which is generated by the image generation unit 14. In this case, the thin-out process is selectively performed in accordance with the areas of the touch patterns P11 to P16.

In one embodiment, a thin-out process is not performed in a portion of the scan region A3 (X10-30) containing the touch patterns P11 to P13 each having a small area (e.g., an area with a predetermined size or less), as indicated by "NON-THIN-OUT REGION B3." Further, a thin-out process is not performed in a portion of the scan region A4 (Y1-25) containing the touch patterns P11 to P13 each having a small area, as indicated by "NON-THIN-OUT REGION B4." On the other hand, a thin-out process is performed in a portion of the scan region A4 (Y1-25) containing the touch patterns P14 to P16 each having a large area (e.g., an area with a predetermined size or greater), as indicated by "THIN-OUT REGION B5." In this manner, the thin-out process is selectively performed in accordance with the areas of the touch patterns. This allows reduction in power consumption while providing operation reliability of a touch detection process.

Figure 8:
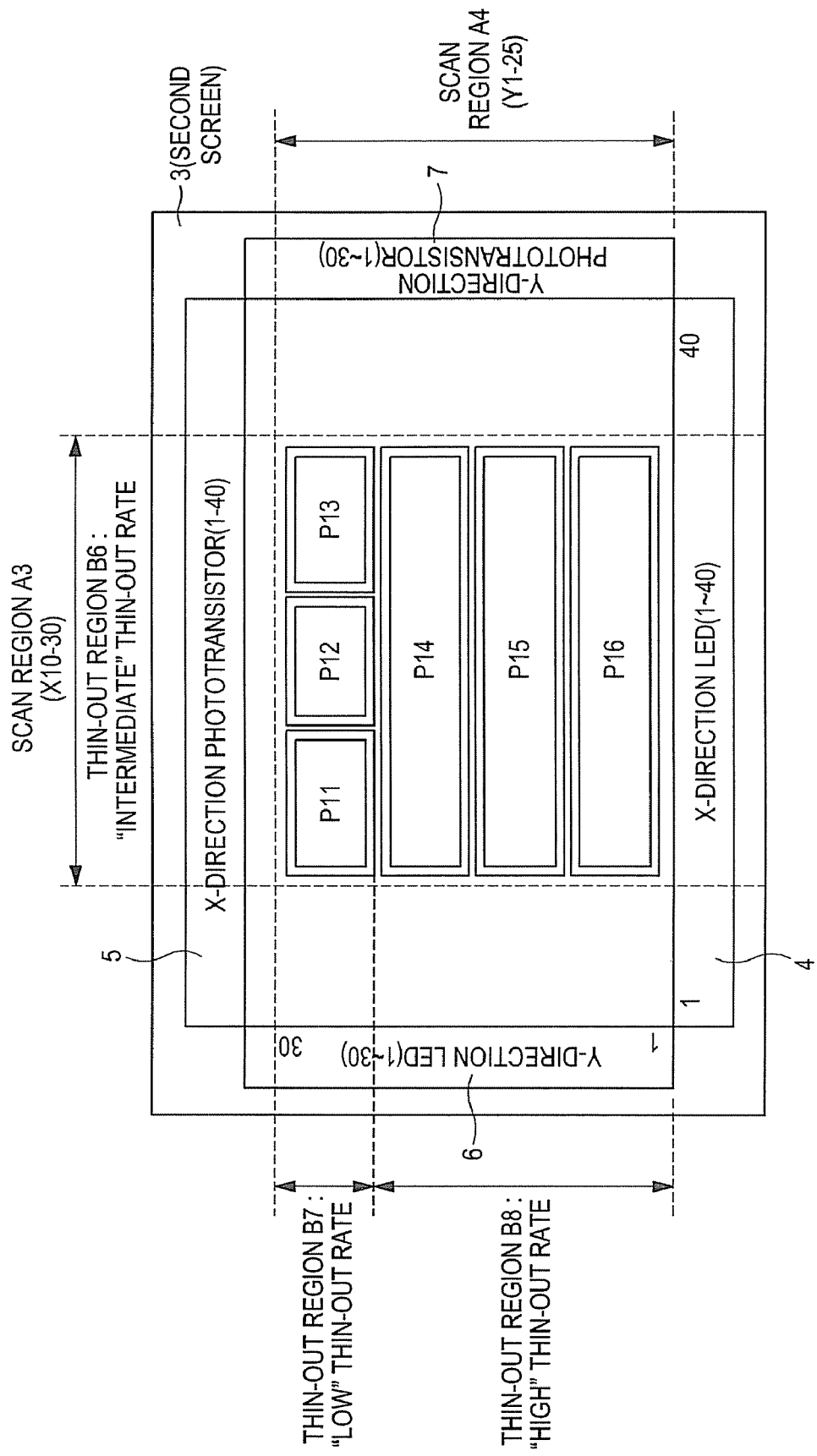
FIG. 8 is an explanatory diagram showing an example of the thin-out process of the touch panel display apparatus.

FIG. 8 shows a plurality of touch patterns P11 to P16 displayed on the display unit 15 based on the pattern frame of the second screen 3 that is generated by the image generation unit 14 in the touch panel display apparatus 1. For the touch patterns shown in FIG. 8, the level of the thin-out process is adjusted in accordance with the areas of the touch patterns P11 to P16.

In one embodiment, the thin-out process may be performed at "an intermediate" thin-out rate in a portion of the scan region A3 (X10-30) containing the touch patterns P11 to P13 each having a small area (e.g., an area with a predetermined size or less), as indicated by "THIN-OUT REGION B6." Further, the thin-out process may be performed at a "low" thin-out rate in a portion of the scan region A4 (Y1-25)

containing the touch patterns P11 to P13 each having a small area, as indicated by "THIN-OUT REGION B7." Further, the thin-out process is performed at a "high" thin-out rate in another portion of the scan region A4 (Y1-25) containing the touch patterns P14 to P16 each having a larger area, as indicated by "THIN-OUT REGION B8." In this manner, the level of the thin-out process is adjusted in accordance with the areas of the touch patterns. Accordingly, the adjustable thin-out process provides reduction in power consumption and operation reliability of the touch detection process simultaneously.

Figure 9:
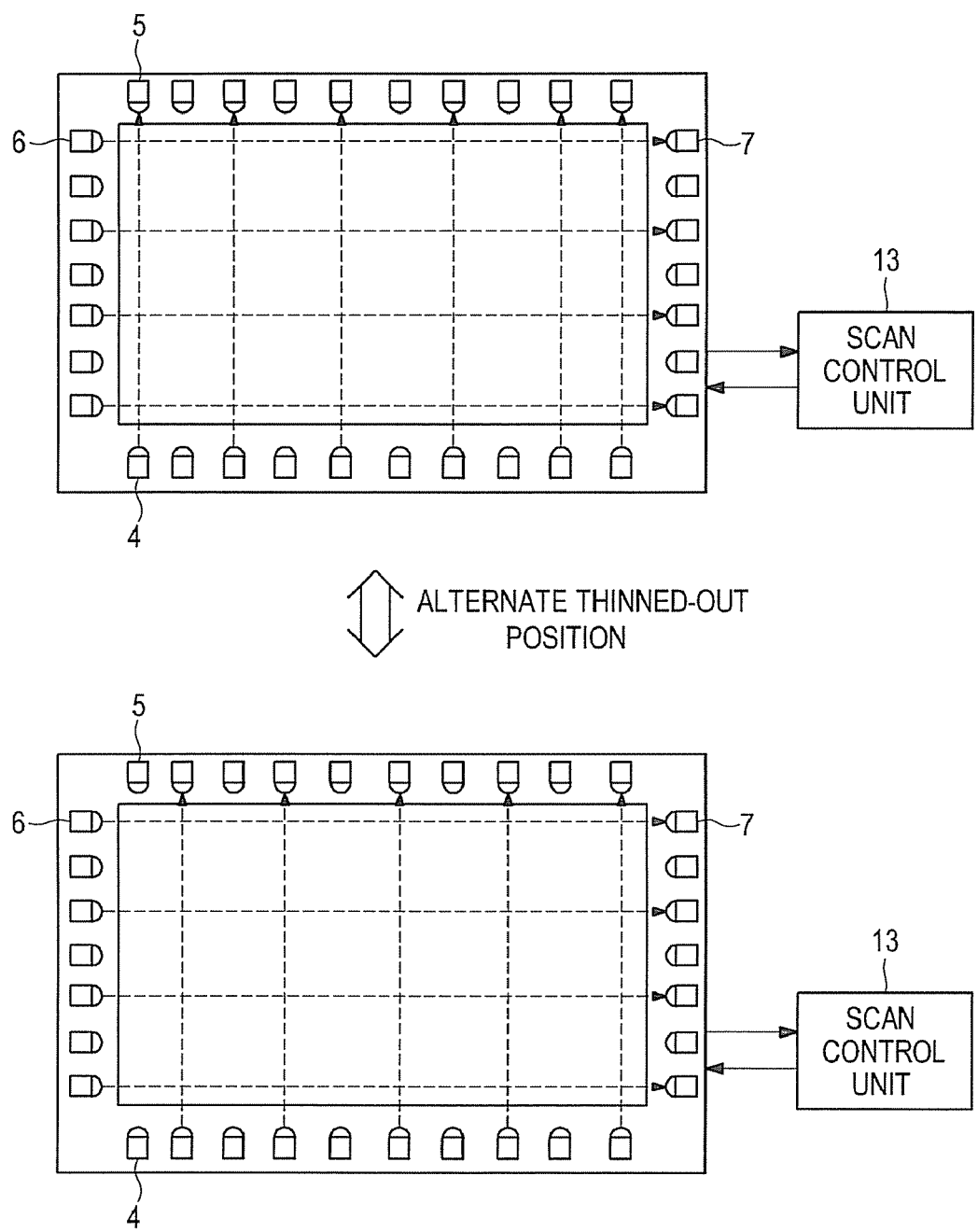
FIG. 9 is an explanatory diagram showing an example of changing thin-out positions in the touch panel display apparatus.

FIG. 9 is an explanatory diagram showing an example of changing thin-out positions in the touch panel display apparatus. When performing the thinning out process, if a predetermined pairs of the light-emitting and light-receiving elements continue to be activated while the other pairs of the light-emitting and light-receiving elements are inactivated, the respective elements may wear out at different rates, leading to a shortening of the lifetime of the apparatus. Thus, by regularly alternating the positions of pairs of the light-emitting and light-receiving elements to be thinned out when performing the thinning out process as shown in FIG. 9, the elements can be made to wear out more uniformly, so that the lifetime of the apparatus can be extended.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. A touch panel display apparatus comprising:
a display unit;
a first horizontal row of light-emitting elements arranged on a first horizontal side of the display unit;
a second horizontal row of light-receiving elements arranged on a second horizontal side of the display unit, each light-receiving element in the second horizontal row configured to receive light from a corresponding light-emitting element in the first horizontal row;
a first vertical row of light-emitting elements arranged on a first vertical side of the display unit;
a second vertical row of light-receiving elements arranged on a second vertical side of the display unit, each light-receiving element in the second vertical row configured to receive light from a corresponding light-emitting element in the first vertical row;
an image generation unit configured to generate an image signal and provide the image signal to the display unit, which displays a touch pattern for use in a touch operation based on the image signal; and
a control unit configured to activate a first set of the light-emitting elements and the corresponding light-receiving elements when the touch pattern is disposed between the light-emitting elements and the corresponding light-receiving elements and inactivate a second set of the light-emitting elements and the corresponding light-receiving elements when the touch pattern is not disposed between the light-emitting elements and the corresponding light-receiving elements.

2. The apparatus of claim 1, wherein if the touch pattern displayed on the display unit is changed, the control unit controls the activation of the first set of the light-emitting elements and the corresponding light-receiving elements based on the position of the changed touch pattern.

3. The apparatus of claim 1, wherein the control unit performs a thin-out process by inactivating a predetermined number of the first set of the light-emitting elements and the corresponding light-receiving elements.

4. The apparatus of claim 3, wherein the control unit performs the thin-out process at a first rate for the light-emitting elements and light-receiving elements corresponding to the touch pattern having a predetermined size or greater and wherein the control unit performs the thin-out process at a second rate for the light-emitting elements and light-receiving elements corresponding to the touch pattern having a size less than the predetermined size.

5. The apparatus of claim 3, wherein the control unit inactivates the light-emitting elements and the light-receiving elements to be thinned out during the thin-out process in alternating positions.

6. A method for use in a touch panel display apparatus including a display unit configured to display an image, the method comprising:
arranging a first horizontal row of light-emitting elements on a first horizontal side of the display unit;
arranging a second horizontal row of light-receiving elements on a second horizontal side of the display unit, each light-receiving element in the second horizontal row configured to receive light from a corresponding light-emitting element in the first horizontal row;
arranging a first vertical row of light-emitting elements on a first vertical side of the display unit;
arranging a second vertical row of light-receiving elements on a second vertical side of the display unit, each light-receiving element in the second vertical row configured to receive light from a corresponding light-emitting element in the first vertical row;
displaying a touch pattern on the display unit; and
activating a first set of the light-emitting elements and the corresponding light-receiving elements when the touch pattern is disposed between the light-emitting elements and the corresponding light-receiving elements and inactivating the second set of the light-emitting elements and the corresponding light-receiving elements when the touch pattern is not disposed between the light-emitting elements and the corresponding light-receiving elements.

7. The method of claim 6, further comprising:
if the touch pattern displayed on the display unit is changed, activating the first set of the light-emitting elements and the corresponding light-receiving elements based on the position of the changed touch pattern.

8. The method of claim 6, further comprising:
detecting a touch operation when light between each light-emitting element and its corresponding light-receiving element is blocked; and
inactivating a predetermined number of the first set of the light-emitting elements and the corresponding light-receiving elements.

9. The method of claim 8, further comprising:
increasing the predetermined number for the light-emitting elements and light-receiving elements corresponding to the touch pattern having a size greater than a predetermined size, and decreasing the predetermined number for the light-emitting elements and light-receiving elements corresponding to the touch pattern having a size less than the predetermined size.

10. The method of claim 8, wherein the predetermined number of the first set of the light-emitting elements and the light-receiving elements are inactivated in alternating positions.

11. A touch panel display apparatus comprising:
- a display unit configured to display an image including a plurality of touch patterns;
- a first horizontal row of light-emitting elements arranged along a first horizontal side of the display unit;
- a second horizontal row of light-receiving elements arranged along a second horizontal side of the display unit;
- a first vertical row of light-emitting elements arranged along a first vertical side of the display unit;
- a second vertical row of light-receiving elements arranged along a second vertical side of the display unit;
- an image generation unit configured to generate the image and provide the image to the display unit; and
- a control unit configured to activate a first set of the light-emitting elements and the corresponding light-receiving elements when a touch pattern is disposed between the light-emitting elements and the corresponding light-receiving elements and inactivate a second set of the light-emitting elements and the corresponding light-receiving elements when the touch patterns is not disposed between the light-emitting elements and the corresponding light-receiving elements.

12. The apparatus of claim 11, wherein the control unit detects a position of a touch operation on the display unit by scanning the first set of the light-emitting elements and the corresponding light-receiving elements.

13. The apparatus of claim 12, wherein the control unit comprises a scan control unit which controls the scanning of the first set of the light-emitting elements and the corresponding light-receiving elements.

14. The apparatus of claim 11, wherein the control unit detects a touch operation when light between each light-emitting element and its corresponding light-receiving element is blocked.

15. The apparatus of claim 14, wherein if the touch patterns displayed on the display unit are changed, the control unit controls the activation of the first set of the light-emitting elements and the corresponding light-receiving elements based on the positions of the changed touch patterns.

16. The apparatus of claim 11, wherein the control unit performs a thin-out process by inactivating the operations of a predetermined number of the light-emitting elements and the corresponding light-receiving elements.

17. The apparatus of claim 16, wherein the control unit selectively performs the thin-out process based on the size of the touch pattern.

18. The apparatus of claim 16, wherein the control unit adjusts the predetermined number of the light-emitting elements and the corresponding light-receiving elements to be inactivated based on the size of the touch pattern.

19. The apparatus of claim 16, wherein the control unit increases the predetermined number for light-emitting elements and light-receiving elements corresponding to the touch pattern having a size greater than a predetermined size and decreases the predetermined number for the light-emitting elements and light-receiving elements corresponding to the touch pattern having a size less than the predetermined size.

20. The apparatus of claim 16, wherein the control unit inactivates the predetermined number of the first set of the light-emitting elements and the light-receiving elements in alternating positions.

\* \* \* \* \*